(12) United States Patent
Melin et al.

(10) Patent No.: US 8,313,712 B2
(45) Date of Patent: Nov. 20, 2012

(54) MICROFLUIDIC VALVE WITH PRESSURE GAIN

(75) Inventors: Jessica E. Melin, Palo Alto, CA (US); Donald C. Stark, Palo Alto, CA (US); James A. Weaver, Palo Alto, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 284 days.

(21) Appl. No.: 12/660,797

(22) Filed: Mar. 3, 2010

(65) Prior Publication Data

US 2010/0233037 A1    Sep. 16, 2010

Related U.S. Application Data

(60) Provisional application No. 61/209,802, filed on Mar. 10, 2009.

(51) Int. Cl.
*B01L 99/00* (2010.01)
(52) U.S. Cl. ............ 422/537; 422/50; 422/500; 422/81; 251/157; 251/172
(58) Field of Classification Search .................... 422/50, 422/500–502, 81, 537; 251/157, 172
See application file for complete search history.

(56) References Cited

U.S. PATENT DOCUMENTS

| | | | |
|---|---|---|---|
| 2003/0123993 A1* | 7/2003 | Dai et al. ...................... | 417/53 |
| 2007/0209574 A1 | 9/2007 | Hansen et al. | |
| 2008/0108122 A1 | 5/2008 | Paul et al. | |

OTHER PUBLICATIONS

Haeberle et al. Centrifugo-magnetic pump for gas-to-liquid sampling, 2007, 28-33, Sensors and Actuators A 135, ScienceDirect.
Jensen et al. Micorpneumatic Digital Logic Structures for Integrated Midrodevice Computation and Control, Dec. 2007, 1378-1385, vol. 16, No. 6, Journal of Microelectromechanical Systems.
Grover et al. Monolithic membrane valves and diaphram pumps for practical large-scale integration into glass microfluid devices, 2003, 315-323, Sensors and Actuators B 89, ScienceDirect.
Quero et al. A Novel Pressure Balanced Microfluidic Valve, 2002, IEEE, ISCAS.
Grover et al. Development and multiplexed control of latching pneumatic valves using microfluidic logical structures, Apr. 2006, 623-631, vol. 6, Royal Society of Chemistry.
Thorsen et al. Microfluidic Large-Scale Integration, Oct. 2002, 580-584, vol. 298, Science.
Rhee et al. Microfluidic pneumatic logic circuits and digital pneumatic microprocessors for integrated microfluidic systems, Aug. 2009, 3131-3134, vol. 9, Royal Society of Chemistry.

* cited by examiner

*Primary Examiner* — Jyoti Nagpaul
(74) *Attorney, Agent, or Firm* — Lumen Patent Firm

(57) ABSTRACT

The current invention provide a microfluidic valve having a housing that includes a microfluid control port disposed adjacent to a microfluid exhaust port, where a movable rigid material having a first diameter is disposed in the housing between the microfluid control port and the microfluid exhaust port. The housing further includes a microfluid pressure port having a first microfluid pressure. The microfluid pressure port is connected to the microfluid exhaust port by a microfluid valve orifice having a second diameter, where the first diameter is larger than the second diameter, and when a second microfluid pressure is applied to the control port the moveable rigid material closes the microfluid valve orifice, where the first microfluid pressure is greater than the second microfluid pressure.

19 Claims, 6 Drawing Sheets

(a)

(b)

(c)

MICROFLUIDIC VALVE WITH PRESSURE GAIN

CROSS-REFERENCE TO RELATED APPLICATIONS

This application is cross-referenced to and claims the benefit from U.S. Provisional Application 61/209,802 filed Mar. 10, 2009, which is hereby incorporated by reference.

STATEMENT REGARDING FEDERALLY SPONSORED RESEARCH OR DEVELOPMENT

This invention was made with Government support under contract HG002644 awarded by National Institutes of Health. The government has certain rights in this invention.

FIELD OF THE INVENTION

The invention relates to microfluid devices. In particular, the invention relates to a microfluidic valve having a pressure gain $\geq 1$.

BACKGROUND

Microfluidics has developed greatly in recent years and monolithic elastic polymer, such as polydimethylsiloxane (PDMS), microfluidic chips are now an enabling technology for creating many high throughput assays. Recently, microfluidic devices fabricated from PDMS using soft lithography have seen widespread use in biology and chemistry. This technology permits inexpensive fabrication and integration of fluidic circuit elements such as channels, valves, and pumps. This development of integrated microfluidic devices has enabled the large-scale integration of biological assays on a single device, often termed lab-on-chip (LOC). Such devices have found important applications in areas including immunology, stem cell culture, and structural chemistry. These systems can perform hundreds of automated assays in parallel, thus reducing operation time and reagent volume. Over the last ten years, PDMS has emerged as the material of choice for many microfluidic systems because of its low cost, ease of fabrication and biological compatibility. Monolithic PDMS membrane valves enable both the sequencing of reagent/reactant flow control structures directly onto PDMS devices. With the increase in the number of flow control operations on a single chip an increase in the number of signal connections are required for control and sequencing. Because of their symmetry, PDMS membrane valves inherently have a pressure gain of less than one, where a lower pressure line cannot be used to control a higher pressure one. This significantly limits membrane valve logic structures to a single level of logic. As a result, many control signals need to be chip inputs driven externally from a higher-pressure source. What is needed is a low-cost valve with pressure gain, where a lower-pressure port controls a higher-pressure port, to enable digital control logic to be built on-chip to reduce external signal counts.

Numerous approaches have achieved pressure gain using materials in addition to or in lieu of PDMS, including Silicon valves and glass-PDMS valves. Unfortunately, the additional cost, required equipment, and complexity of working with other materials has limited the adoption of these valves to logic technologies for highly integrated LOCs.

Valves made with conventional PDMS soft lithography tend to require a control pressure greater than the pressure in the line being controlled to turn the value off, where the pressure gain of the valve is less than one. Other PDMS soft lithography valves currently provided are actuated using vacuum or magnetic drive sources.

Accordingly, there is a need to develop a valve exhibiting pressure gain that can be easily implemented in the standard PDMS planar process. Such a valve would allow static logic gates to be built directly on chips using soft lithography.

SUMMARY OF THE INVENTION

The current invention provide a microfluidic valve having a housing that includes a microfluid control port disposed adjacent to a microfluid exhaust port, where a movable rigid material having a first diameter is disposed in the housing between the microfluid control port and the microfluid exhaust port. The housing further includes a microfluid pressure port having a first microfluid pressure. The microfluid pressure port is connected to the microfluid exhaust port by a microfluid valve orifice having a second diameter, where the first diameter is larger than the second diameter, and when a second microfluid pressure is applied to the control port the moveable rigid material closes the microfluid valve orifice, where the first microfluid pressure is greater than the second microfluid pressure.

In one aspect of the invention, the housing can be an elastic polymer material.

In another aspect of the invention, the housing can be Polydimethylsiloxane (PDMS).

According to one aspect of the invention, the housing can include a first layer disposed on a second layer, where the second layer is disposed on a third layer and the third layer is disposed on a fourth layer. Here the microfluid pressure port is disposed in the first layer. Here the microfluid valve orifice is disposed in the first layer or the second layer, the microfluid exhaust port is disposed in the second layer, the movable rigid material is disposed in the second layer or the third layer, and the microfluid control port is disposed in the forth layer.

In a further aspect of the invention, the microfluid control port and the movable rigid material are disposed to provide a pressure gain of greater than one relative to the first microfluid pressure in the microfluid pressure port.

According to another aspect, the microfluidic valve is disposed in a logic structure that can include a simple buffer, a two-input AND gate, a two-input OR gate, a simple inverter, a static latch having a dual rail load enable, and a two-input to four-output binary decoder.

In yet another aspect of the invention, an area of the microfluid exhaust port is at least equal to an area of the microfluid valve orifice.

In a further aspect, an area of the movable rigid material is at least equal to an area of the microfluid exhaust port.

According to another aspect of the invention, an area of the microfluid control port is at least equal to an area of the microfluid exhaust port.

In a further aspect, a thickness of the microfluid pressure port is at least equal to 0.5 times a thickness of the microfluid exhaust port.

In one aspect, a length of the microfluid valve orifice is at least equal to 0.5 times a thickness of the microfluid exhaust port.

In another aspect of the invention, a thickness of the microfluid exhaust port is at least equal to 0.05 times a minor dimension of an area of the microfluid exhaust port.

In a further aspect, a thickness of the movable rigid material is at least equal to 0.05 times a minor dimension of an area of the movable rigid material.

In yet another aspect of the invention, a thickness of the housing enveloping the movable rigid material is greater than a thickness of the movable rigid material.

In one aspect, a thickness of the microfluid control port is at least equal to 0.5 times a thickness of the microfluid exhaust port.

BRIEF DESCRIPTION OF THE FIGURES

The objectives and advantages of the present invention will be understood by reading the following detailed description in conjunction with the drawing, in which.

DETAILED DESCRIPTION OF THE INVENTION

Although the following detailed description contains many specifics for the purposes of illustration, anyone of ordinary skill in the art will readily appreciate that many variations and alterations to the following exemplary details are within the scope of the invention. Accordingly, the following preferred embodiment of the invention is set forth without any loss of generality to, and without imposing limitations upon, the claimed invention.

The current invention provides a microfluidic valve having a pressure gain ≧1. The microfluidic valve has a housing made from an elastic polymer, such as polydimethylsiloxane (PDMS). The housing includes a microfluid control port disposed adjacent to a microfluid exhaust port, where a movable rigid material is disposed in the housing between the microfluid control port and the microfluid exhaust port. The movable rigid material is a non-ferric material, such as silicon, that is not affected by the presence of magnetic or electromagnetic fields. The housing further includes a microfluid pressure port connected to the microfluid exhaust port by a microfluid valve orifice. The size of the valve orifice has an opening that is smaller than the opening of the microfluid pressure port. When a microfluid pressure is applied to the control port, the moveable rigid material moves within the microfluid exhaust port to close the microfluid valve orifice, where the microfluid pressure in the microfluid pressure port is greater than the microfluid pressure in the microfluid control port. The valve can close and open to control the flow through the respective ports in either direction, where fluid may also enter the exhaust port and leave the source port.

Figure 1:
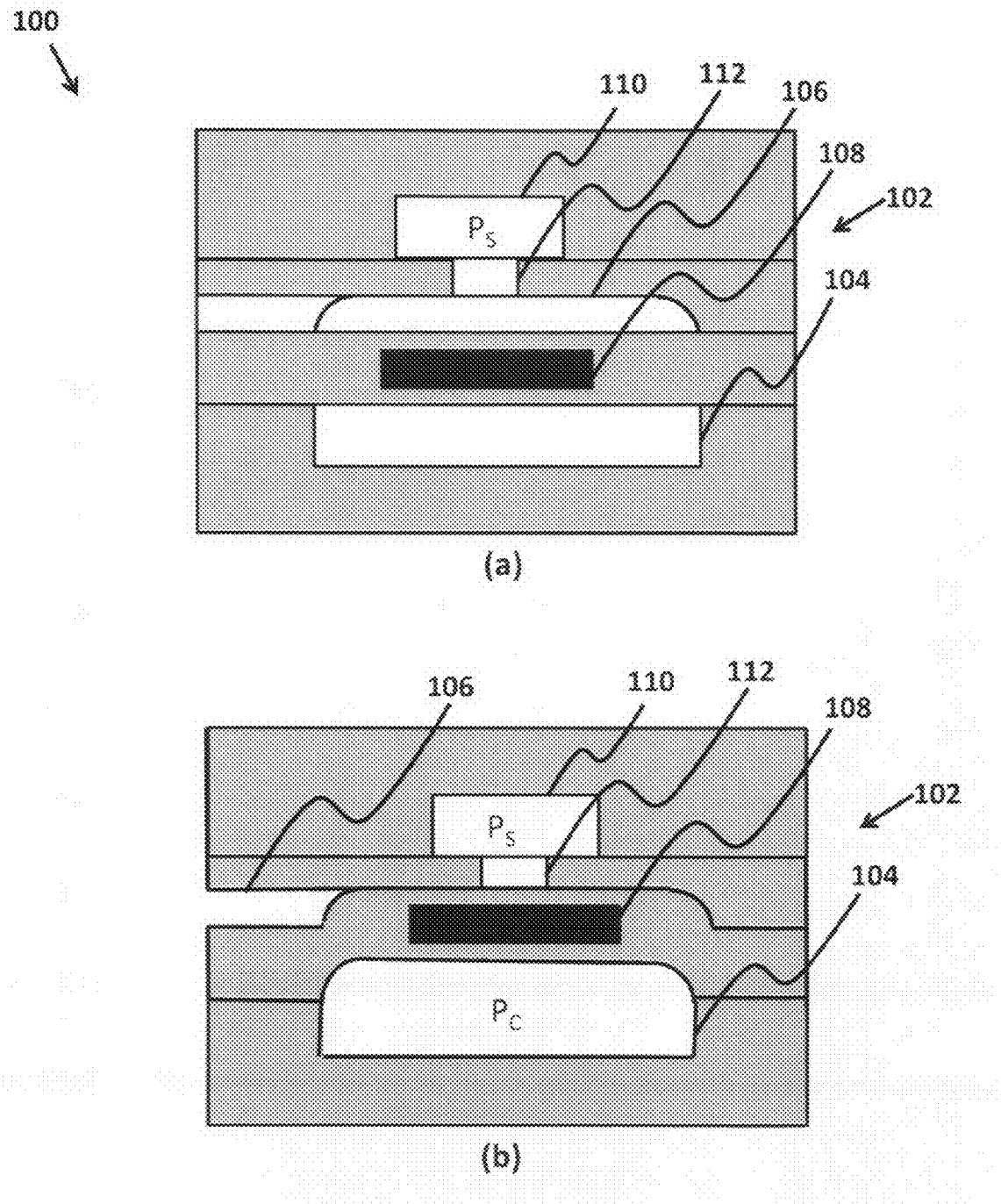
FIGS. 1a-1b show cross-section views of the microfluid valve in an open and closed state, respectively according to the present invention.

FIGS. 1a-1b show cross-section views of the microfluid valve having a pressure gain ≧1 100 in an open and closed state, respectively. The microfluid valve 100 has a housing 102 that includes a microfluid control port 104 disposed adjacent to a microfluid exhaust port 106, where a movable rigid material 108 having a first diameter is disposed in the housing 102 between the microfluid control port 104 and the microfluid exhaust port 106. The housing 102 further includes a microfluid pressure port (source line) 110 having a first microfluid pressure $P_S$. The microfluid pressure port 104 is connected to the microfluid exhaust port 106 by a microfluid valve orifice 112 having a second diameter, where the first diameter is larger than the second diameter, and when a second microfluid pressure $P_C$ is applied to the control port 104 the moveable rigid material 108 closes the microfluid valve orifice 112, as shown in FIG. 1b, where the first microfluid pressure $P_S$ is greater than the second microfluid pressure $P_C$.

When the valve 100 is closed, the area of the disk 108 exposed to the control pressure $P_C$ significantly exceeds the area of the disk 108 exposed to the pressure $P_C$ of the line being controlled, thereby providing a pressure gain >1. Such relatively rigid disks 108 can be made of standard soft lithography materials (e.g., such as SU-8 photoresist in connection with PDMS soft lithography). The use of standard soft lithography materials greatly reduces fabrication cost/complexity compared to conventional approaches for pressure gain >1 that require significant modification of normal soft lithography (e.g., using etched glass channels). Integration of the stiffer material facilitates force summation and the material is compatible with the planar process currently used for multi-layer soft lithography.

Figure 2:
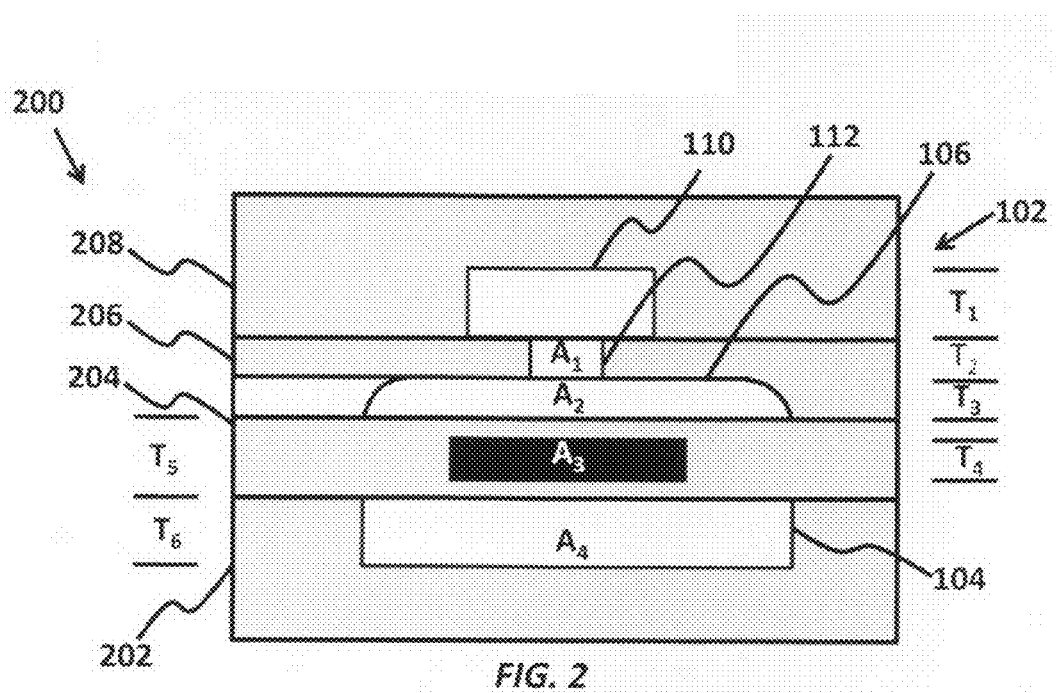
FIG. 2 shows one exemplary embodiment of the current invention.

FIG. 2 shows one exemplary embodiment 200, the invention is made from four PDMS layers. Layer 202 contains a 300 µm diameter control port 104 and its associated control line, layer 204 contains a 35 µm thick encapsulated disk of SU-8 photoresist, layer 206 contains a 300 µm diameter exhaust port 106 and a 30 µm diameter valve orifice 112, and layer 208 contains a 100 µm wide, 100 µm high pressure port (source line) 110 centered over the valve orifice 112. With no pressure in the control port 104, the normal fluid flow is from the source line 110 through the valve orifice 112 to the exhaust port 106. For switching applications, the exhaust port 106 is normally maintained at a low pressure relative to the source line 110.

When increasing pressure is applied to the control port 104, PDMS layer 204 containing the rigid element 108, such as a SU-8 disk, is driven into the exhaust port 106 until the layer 204 is driven into contact with the upper surface of the exhaust port 106, sealing-off the valve orifice 112 and stopping fluid flow through the valve 100/200. The rigid SU-8 disk 108 (shear modulus approximately 1 GPa) is stiff enough to allow force summation across its surfaces. The control pressure $P_C$ acts over the entire bottom side of the disk 108, while the source pressure $P_S$ only acts over the area of the orifice 112. In the closed state, the upper bound on the pressure gain is set by the ratio of the disk and orifice diameters:

$$A_P = \frac{P_{Source}}{P_{Control}} = \left(\frac{D_{Disk}}{D_{Orifice}}\right)^2$$

Figure 3:
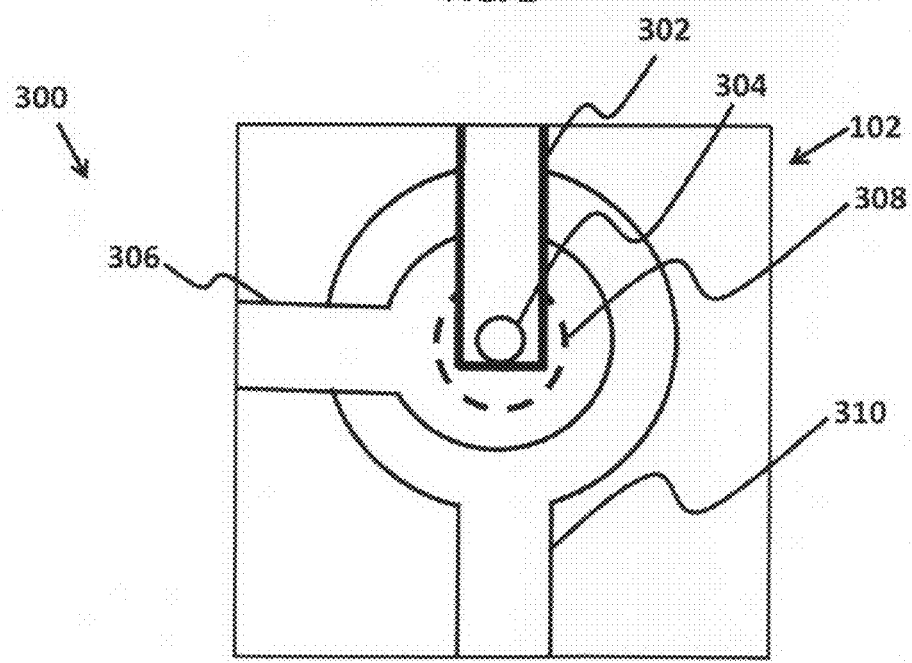
FIG. 3 shows a schematic top view of the microfluid valve having a pressure gain ≧1 according to the present invention.

FIG. 3 shows a schematic top view of the microfluid valve 300 having a pressure gain ≧1. The pressure port (source line) 302 is shown having the orifice 304 disposed to connect the pressure port (source line) 302 with the exhaust port 306. Shown below the exhaust port 306 in dashed lines is the movable rigid element 308 that is enveloped in a layer of the elastic polymer material, where the movable rigid element 308 is further disposed above the control port 310. One key aspect of the current invention is that the rigid element 308, in addition to the entire assembly, is produce using a planar process compatible with production of chips using soft lithography.

Figure 4:
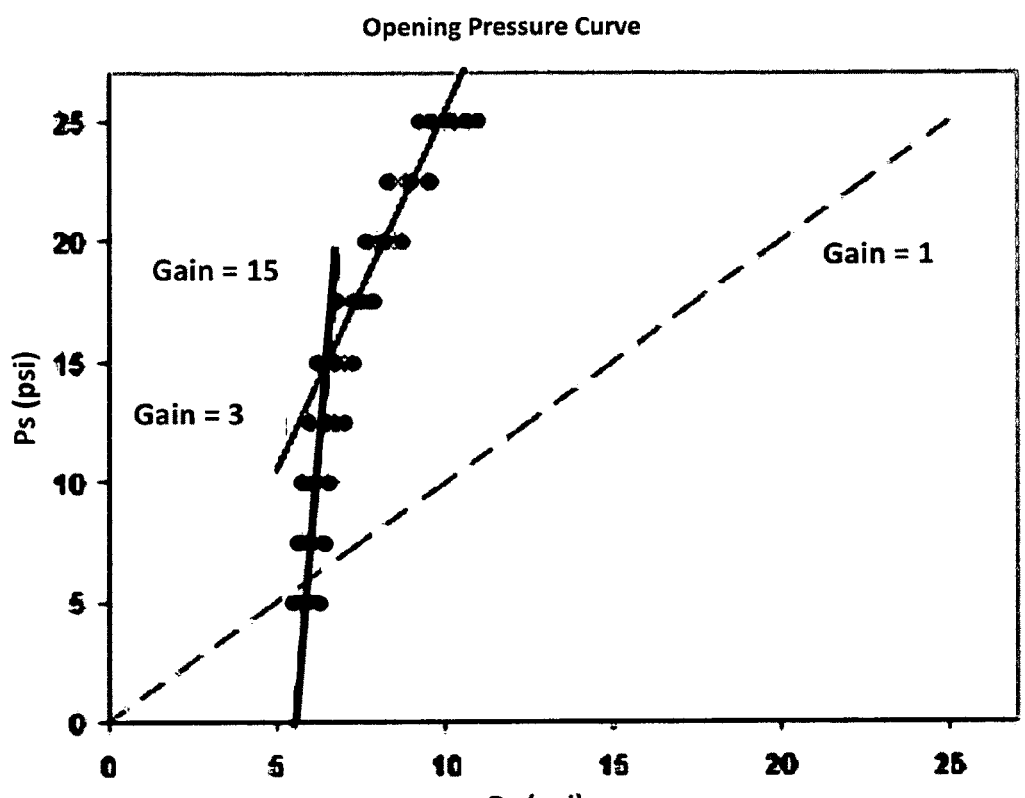
FIG. 4a shows the opening threshold pressure of 10 gain valves according to the present invention.
FIG. 4b shows an arbitrary shape that may be used for any of the port and orifice openings.
Figure 4:
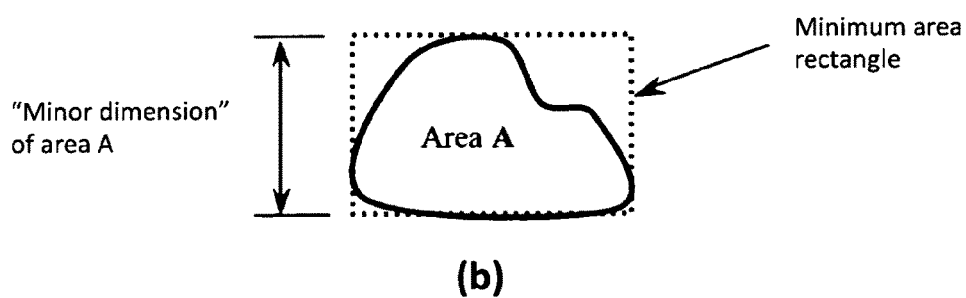

In one example, the disk diameter is 140 µm, and the orifice diameter is 30 µm. This gives a pressure gain upper bound of 22. In addition to pressure gain, the valve 100/200 also has a pressure threshold. This is the control pressure $P_C$ required to drive layer 204 into contact with the exhaust port 206 ceiling at zero source line pressure $P_C$. Finite element simulation using the design dimensions in this example gave a threshold pressure of 4.5 psi. To check these results two chips were constructed, each containing 12 valves, and measured the control pressures $P_C$ at which each valve opened as a function of source line pressure $P_S$ with the pressure in the exhaust line 106 at ambient. The working fluid was de-ionized water in both source 110 and control lines 104. All 24 of these valves functioned and exhibited opening pressure gains greater than 1. The results for a representative sample of 10 of these valves are shown in FIG. 4a. The source line pressure, $P_S$, is plotted against the control port pressure, $P_C$, at which a closed valve just opened. The slope of the $P_S$ vs. $P_C$ curve gave an average incremental gain of 15, fairly close to the predicted upper bound using the above equation. As source line pressure increases, 204 (see FIG. 2) begins to deform into the exhaust port 106, reducing the gain to 3 for source line pressures above 15 psi. This gain of 3 was quite consistent out to the maximum $P_S$ value tested, which was 25 psi. By extrapolating the line with gain of 15 to the zero source line pressure, the valve threshold pressure was found to be 6 psi which is close to the value obtained from simulation. These results were quite consistent across all the valves measured. Also plotted in FIG. 4 is the $P_S=P_C$ line which indicates a gain of exactly 1. For a digital gate to function properly, the large signal gain must also be greater than one. In the figure, this is the region to the right of $P_C=6$ psi and above the gain of 1 line. As can be seen, this condition is met for source line pressures greater than 7 psi.

Referring again to FIG. 2, it should be evident that there are numerous variations on the dimensions of the elements of the microfluid valve that will provide pressure gain $\geq 1$. According to the current invention, the area A2 of the microfluid exhaust port is at least equal to an area of the microfluid valve orifice A1. In a further aspect, an area of the movable rigid material A3 is at least equal to an area of the microfluid exhaust port A2. According to another aspect of the invention, an area of the microfluid control port A4 is at least equal to an area of the microfluid exhaust port A2. In a further aspect, a thickness of the microfluid pressure port T1 is at least equal to 0.5 times a thickness of the microfluid exhaust port TT. In one aspect, a length of the microfluid valve orifice T2 is at least equal to 0.5 times a thickness of the microfluid exhaust port T3. In another aspect of the invention, a thickness of the microfluid exhaust port T3 is at least equal to 0.05 times a minor dimension of an area of the microfluid exhaust port A2. In a further aspect, a thickness of the movable rigid material T4 is at least equal to 0.05 times a minor dimension of an area of the movable rigid material A3. In yet another aspect of the invention, a thickness of the housing enveloping the movable rigid material T5 is greater than a thickness of the movable rigid material T4. And, in one other aspect, a thickness of the microfluid control port T6 is at least equal to 0.5 times a thickness of the microfluid exhaust port T3. It should be evident that the orifice and port shapes can take many forms, where a planar cross section shape can include circular, rectangular, square, triangular, oval or uncommon random and arbitrary shapes (see FIG. 4b), to name a few.

Constructing digital logic gates from these valves requires developing a pressure signal from the source flow that is sufficient to control another valve. Analogous to Resistor-Transistor Logic, an early solid-state electronic logic family, a fluidic resistor was placed in series with the valve's source line. This constriction caused the pressure at the valve's source to fall to a low level when the valve is open. This also has the effect of keeping the pressure in the exhaust chamber low, reducing the pressure required to close the valve. For the technology of the current invention, fluidic resistors are created in the same PDMS layer as the exhaust port 106 (layer 206 in FIG. 2) because its thin cross section allows for compact devices.

Figure 5:
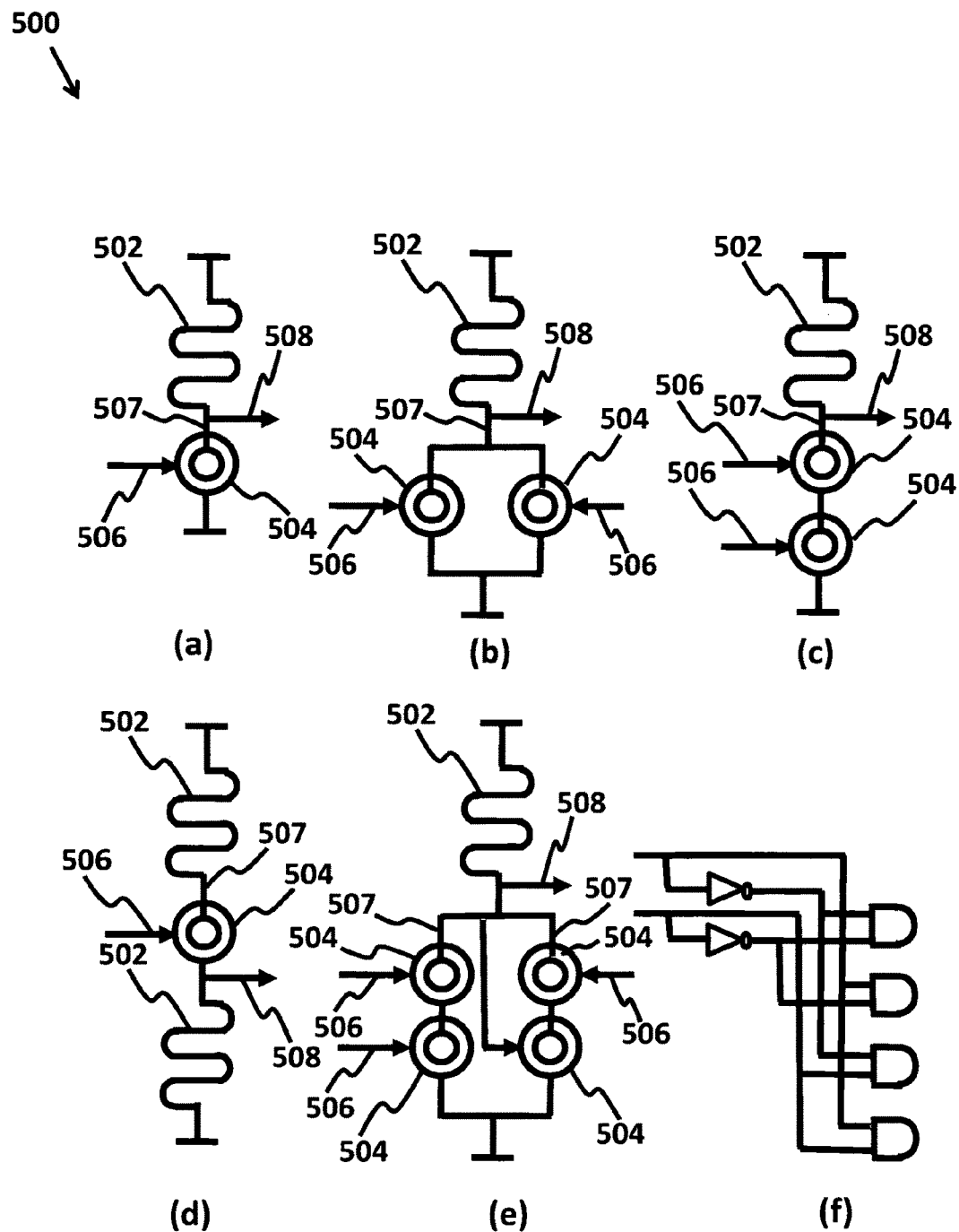
FIGS. 5a-5f show some exemplary logic diagrams enabled using the microfluid valve according to the present invention.

Referring now to FIGS. 5a-5f, where show are some exemplary logic diagrams 500 enabled using the microfluid valve according to the present invention. FIG. 5a shows that a non-inverting buffer 502 is constructed by placing a resistor 502 in series with a single valve 504. With the valve 504 closed, there is no flow through the valve 504, and the pressure at the source line 508 to the valve 504 rises to the supply level, $P_S$, which is sufficient to close the valve 504 of a similarly constructed buffer. When the valve 504 is opened, the pressure loss across the resistor 502 drops the pressure at the source line 508 below the threshold level of subsequent gates. The fluidic resistor 502 pressure drop is set to be at least 10 times that of the valve 504 itself, resulting in an output 508 low pressure that is less than 10% of the source pressure. For AND gates shown in FIG. 5b, two valves are placed in parallel; high pressure is required at both control inputs 506 to stop flow through the resistor 502 and allow the output 508 to go high. Placing two valves 504 in series produces a fluidic OR gate, as shown in FIG. 5c. Closing either valve 504 stops the flow, giving a pressure of $P_S$ at the control input 506 end of the resistor 502. With OR gates, care must be taken to size the fluidic resistor 502 large enough such that the pressure drop across the series valves 504 still gives an output level low enough not to close valves in succeeding logic stages.

The natural form for inverting logic in this technology would be to place a fluidic resistor 502 at the exhaust 508 side of the valve 504 rather than the source 507. The sensitivity of valve 504 closing pressure to exhaust pressure makes these challenging to implement: as exhaust pressure rises, the control pressure must also rise. To reduce this effect, inverters are designed with equal size fluidic resistors 502 connected to both the source 507 and exhaust 508, as shown in FIG. 5d. The gate output is taken from the exhaust 508 side of the lower resistor 502. The pressure drop across these resistors 502 is made much larger than the drop through the valve 504, and the placement of both of these resistors 502 on the same PDMS layer 204 (see FIG. 2) reduces the effect of resistance variation on the resistance ratio. When the valve 504 is closed, the output pressure is zero, and when the valve 504 is open, the output pressure is half of the source pressure $P_S$. As shown in FIG. 4, this degraded high level is still high enough to close a non-inverting buffer; as long as each inverter is followed by a non-inverting stage, the gates operate correctly.

Figure 6:
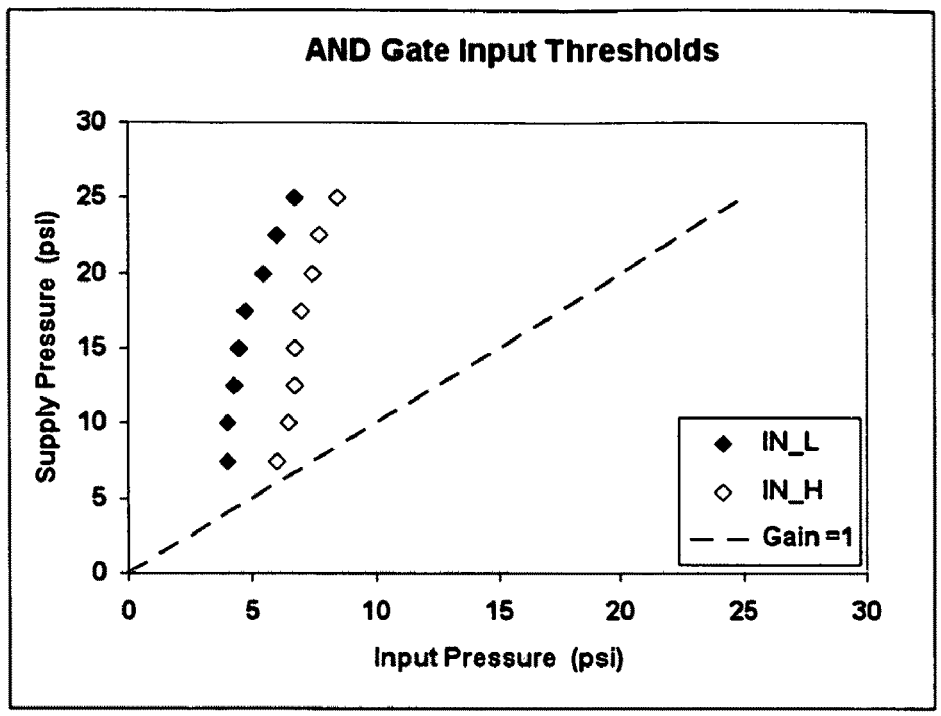
FIGS. 6a-6c show graphs of source supply pressure versus transition thresholds for buffer, AND, OR, inverter logic configurations according to the present invention.
Figure 6:
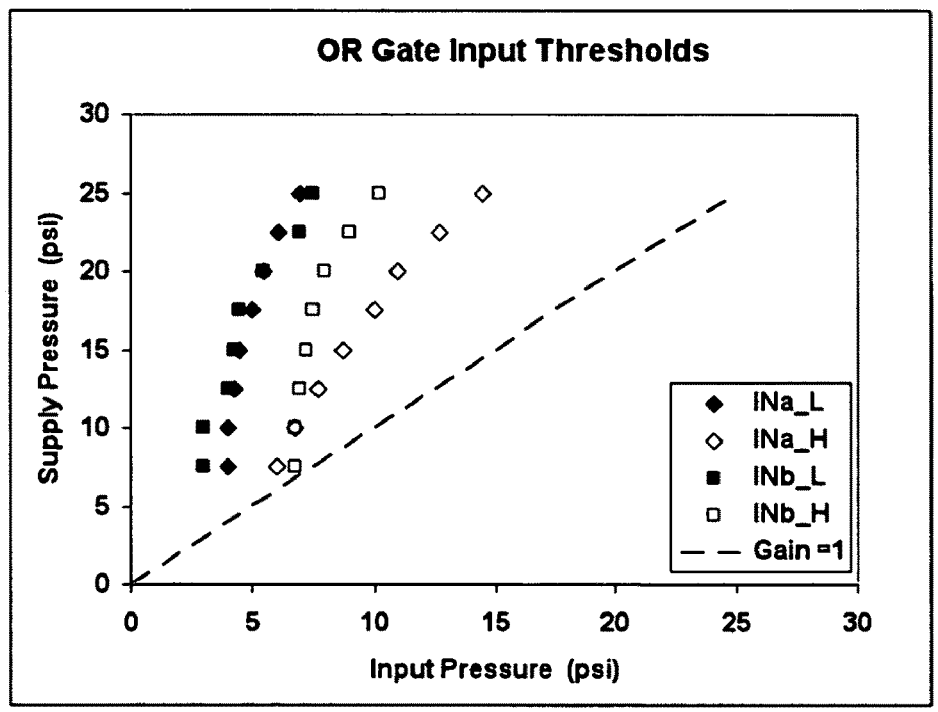
Figure 6:
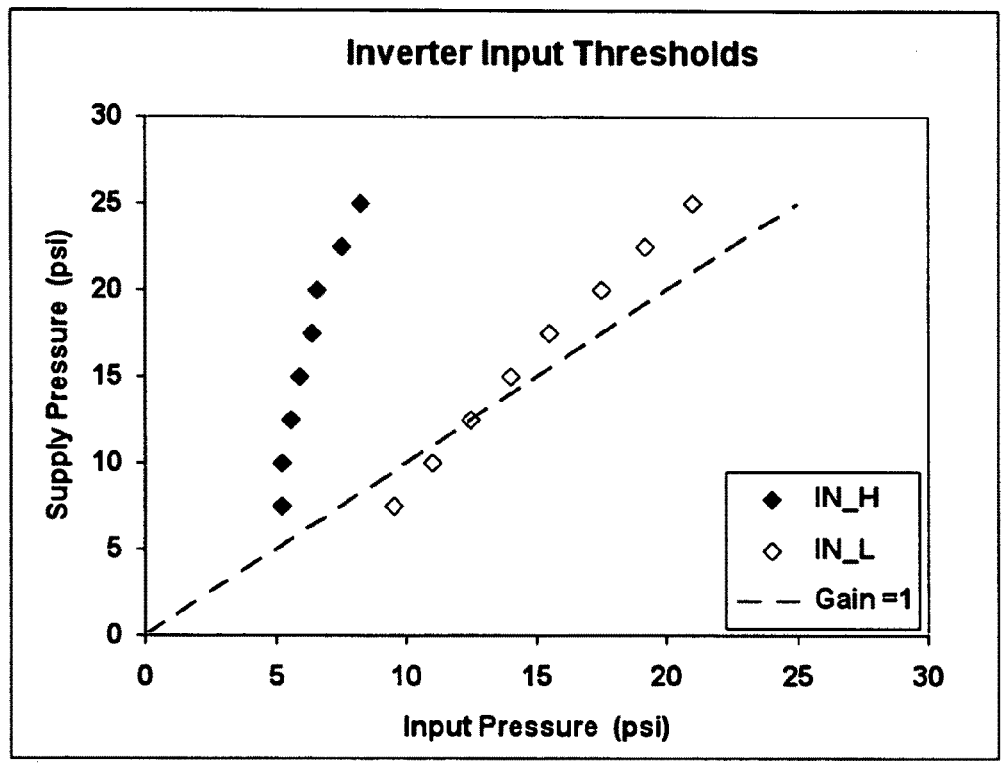

To verify gate operation, all four gate types (buffer, AND, OR, inverter) were fabricated and tested. Graphs of source supply pressure versus transition thresholds are shown in FIGS. 6a-6c, where the input pressure required for a high gate output is IN_H and the input pressure required for a low gate output is IN_L. The non-inverting AND and OR gates work correctly down to a source pressure of 7.5 psi, and show the expected hysteresis arising from the valve's differing opening and closing pressures. The two inputs of the OR gate show slightly different IN_H values, as is expected since valve B (FIG. 5c) increases the closing pressure of valve A. The operating range for inverters is much narrower due to the elevated exhaust pressure, but they also operate correctly for source pressures above 17 psi. Since the output of an inverter is half the source pressure, these two results indicate that mixed inverting and non-inverting logic must have a source pressure of at least 20 psi to operate properly.

Using these gates together with micro-vias to interconnect the source, exhaust, and control channels, we constructed a static latch (FIG. 5e) and a 2-into-4 binary decoder (FIG. 5f). Both a true and complement form of the load signal, LD, are supplied to the latch. Correct operation of both structures was demonstrated for a source pressure of 25 psi.

These results show that valves can be implemented using the standard PDMS process with sufficient pressure gain to integrate multiple stages of logic. Large signal pressure gains in the range of 1.6 to 2.5 are achieved using working pressures in the 10 psi to 20 psi range. Measurements of opening and closing pressures showed good consistency between valves, indicating that acceptable yield can be achieved for practical devices. Both inverting and non-inverting logic can be implemented using these valves in conjunction with micro-vias. The ability to construct large digital circuits directly in multilayer soft lithography gives LOC designers new design options to decrease the number off-chip control lines by using serial input/output techniques and by construction of on-chip controllers and sequencers. Such innovations will bring automated microfluidic systems for biochemical analysis to the next level of automation and control.

According to one aspect of the invention, the pressure gain valve can be fabricated using soft lithography techniques. In one example, four different master molds are provided and are fabricated using conventional photolithography techniques. The four master molds are 1) CONTROL mold, 2) SOURCE mold, 3) EXHAUST/VIA mold, and 4) THRU mold. The CONTROL and SOURCE molds define the control and source channels of the device, which are 100 um tall for example. Silicon wafers, such a 3-inch diameter wafers, are used as the mold substrate and 100 um thick SU8-2075 is spun onto the silicon surface using a Laurel WS400B-6 NPP LITE spinner. The resist-covered wafers are subsequently exposed to UV light and developed in SU-8 developer solution. The EXHAUST/VIA mold defines the exhaust channel features as well as the valve orifice/via. To create this mold, a 27 µm thick layer, for example, of SU8-2025 is spun onto the surface, UV exposed, and developed. Second, a 60 um thick layer, for example, of SU8-2075 is spun onto the surface and photolithographically defined. To create the final THRU mold, a ~100 um thick photoresist layer, for example, is spun onto a silicon wafer using SU8-100 and photolithographically patterned. These THRU structures enable a vertical channel between the exhaust and control channels, which is necessary to realize certain logic devices.

The following exemplary protocol can be used to fabricate the actual PDMS gain valve device. First, all molds are exposed to TMCS (trimethylchlorosilane) vapors to ensure the PDMS will not stick to the mold surface during polymerization. The two thick layers of the device can then be fabricated: control layer and source layer, each ~3 mm thick, for example. In this example, a 5:1 ratio of RTV 615 PDMS is mixed using a Thinky AR-250 Super mixer, poured onto the SOURCE and CONTROL molds separately, and cured at 80° C. for 30 min. The control and flow layers are peeled from their molds, diced into chips, and inlet/outlet ports are punched. Next, the disk layer is fabricated by mixing a 20:1 ratio of PDMS, spinning it onto the surface of the THRU mold (2000 rpm, 60 sec), degassing in vacuum, and curing for 30 min. Subsequently, the surface is exposed to air plasma (10 sec, 70 W, 300 mTorr, SP-106 Plasma System) and a 35 µm thick layer of SU8-2035 is spun onto the surface. The photoresist is exposed and developed using conventional techniques. A second layer of PDMS, which is created using the same parameters as the bottom layer, then encapsulates the disk. The control layer is then aligned to the disk layer under the microscope and cured for 30 min. To create the exhaust layer, 20:1 PDMS is mixed, spun onto the EXHAUST/VIA mold, degassed in vacuum and cured for 30 min. Once cured, the photoresist posts, which define the valve orifice, protrude out of the spun PDMS layer, thus creating a hole through the thin PDMS layer. The exhaust layer and source layer are aligned and bonded at 80° C. for 30 min. Once the source-exhaust sandwich and the disk-control sandwich are fully bonded, they are peeled from their corresponding molds and inlet/outlet ports are punched. Finally, the two PDMS sandwiches are aligned to each other and bonded at 80° C. for 8 hours. Other geometries and thickness are possible, and variations in times, temperatures and materials are within the scope of the invention.

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. All such variations are considered to be within the scope and spirit of the present invention as defined by the following claims and their legal equivalents.

What is claimed:

1. A microfluidic valve, comprising:
   a. an elastic polymer housing, wherein said elastic polymer housing comprises:
      i. a microfluid control port disposed adjacent to a microfluid exhaust port, wherein a movable rigid material having a first diameter is disposed in said elastic polymer housing between said microfluid control port and said microfluid exhaust port;
      ii. a microfluid pressure port having a first microfluid pressure, wherein said microfluid pressure port is connected to said microfluid exhaust port by a microfluid valve orifice having a second diameter, wherein said first diameter is larger than said second diameter, wherein when a second microfluid pressure is applied to said control port said moveable rigid material operates said microfluid valve orifice.

2. The microfluidic valve of claim 1, wherein said elastic polymer housing comprises Polydimethylsiloxane (PDMS).

3. The microfluidic valve of claim 2, wherein said microfluid pressure port is disposed in said first layer.

4. The microfluidic valve of claim 2, wherein said microfluid valve orifice is disposed in said first layer or said second layer.

5. The microfluidic valve of claim 2, wherein said microfluid exhaust port is disposed in said second layer.

6. The microfluidic valve of claim 2, wherein said movable rigid material is disposed in said second layer or said third layer.

7. The microfluidic valve of claim 2, wherein said microfluid control port is disposed in said forth layer.

8. The microfluidic valve of claim 1, wherein said elastic polymer housing comprises a first layer disposed on a second layer, wherein said second layer is disposed on a third layer and said third layer is disposed on a fourth layer.

9. The microfluidic valve of claim 1, wherein said control port and said rigid element are disposed to provide a pressure gain of greater than one relative to said microfluid first pressure in said microfluid pressure port.

10. The microfluidic valve of claim 1, wherein said microfluidic valve is disposed in a logic structure selected from the group consisting of a simple buffer, a two-input AND gate, a two-input OR gate, a simple inverter, a static latch having a dual rail load enable, and a two-input to four-output binary decoder.

11. The microfluidic valve of claim 1, wherein an area of said microfluid exhaust port is at least equal to an area of said microfluid valve orifice.

12. The microfluidic valve of claim 1, wherein an area of said movable rigid material is at least equal to an area of said microfluid valve orifice.

13. The microfluidic valve of claim 1, wherein an area of said microfluid control port is at least equal to an area of said microfluid exhaust port.

14. The microfluidic valve of claim 1, wherein a thickness of said microfluid pressure port is at least equal to 0.5 times a thickness of said microfluid exhaust port.

15. The microfluidic valve of claim 1, wherein a length of said microfluid valve orifice is at least equal to 0.5 times a thickness of said microfluid exhaust port.

16. The microfluidic valve of claim 1, wherein a thickness of said microfluid exhaust port is at least equal to 0.05 times a minor dimension of an area of said microfluid exhaust port.

17. The microfluidic valve of claim 1, wherein a thickness of said movable rigid material is at least equal to 0.05 times a minor dimension of an area of said movable rigid material.

18. The microfluidic valve of claim 1, wherein a thickness of said elastic polymer housing enveloping said movable rigid material is greater than a thickness of said movable rigid material.

19. The microfluidic valve of claim 1, wherein a thickness of said microfluid control port is at least equal to 0.5 times a thickness of said microfluid exhaust port.

\* \* \* \* \*